US007630406B2

(12) United States Patent
Sood et al.

(10) Patent No.: US 7,630,406 B2
(45) Date of Patent: Dec. 8, 2009

(54) METHODS AND APPARATUS FOR PROVIDING A DELAYED ATTACK PROTECTION SYSTEM FOR NETWORK TRAFFIC

(75) Inventors: Kapil Sood, Beaverton, OR (US); Jesse Walker, Portland, OR (US); Emily H. Oi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 11/267,697

(22) Filed: Nov. 4, 2005

(65) Prior Publication Data
US 2007/0104203 A1 May 10, 2007

(51) Int. Cl.
*H04J 3/06* (2006.01)
(52) U.S. Cl. .................. 370/503; 370/394; 370/395.71; 370/400; 370/509; 370/510; 370/512; 370/517; 370/522; 709/206; 709/230; 726/23
(58) Field of Classification Search ................. 370/503, 370/394, 395.71, 400, 509, 510, 512, 517, 370/522; 709/206, 230; 726/23
See application file for complete search history.

(56) References Cited

U.S. PATENT DOCUMENTS

| 6,247,059 | B1* | 6/2001 | Johnson et al. ............. 709/237 |
| 6,952,708 | B2* | 10/2005 | Thomas et al. ........... 707/104.1 |
| 2002/0181435 | A1* | 12/2002 | Miklos et al. ............... 370/348 |
| 2003/0112826 | A1* | 6/2003 | Ashwood Smith et al. .. 370/503 |
| 2003/0236841 | A1* | 12/2003 | Epshteyn .................... 709/206 |
| 2004/0210657 | A1* | 10/2004 | Narayanan et al. .......... 709/227 |
| 2004/0253979 | A1* | 12/2004 | Burr ........................ 455/552.1 |
| 2005/0136882 | A1* | 6/2005 | Boulton ................... 455/343.4 |
| 2006/0262932 | A1* | 11/2006 | Sood et al. ................... 380/272 |
| 2008/0250498 | A1* | 10/2008 | Butti et al. ..................... 726/23 |

OTHER PUBLICATIONS

Kapil Sood, et al. "Systems and Methods for Negotiating Security Parameters for Protecting Management Frames in . . . ", U.S. Appl. No. 11/131,931, filed May 17, 2005.

* cited by examiner

*Primary Examiner*—William Trost, IV
*Assistant Examiner*—Toan D Nguyen
(74) *Attorney, Agent, or Firm*—Schwabe, Williamson & Wyatt, P.C.

(57) ABSTRACT

Embodiments of methods and apparatus for providing a delayed attack protection system for network traffic are generally described herein. Other embodiments may be described and claimed.

18 Claims, 5 Drawing Sheets

METHODS AND APPARATUS FOR PROVIDING A DELAYED ATTACK PROTECTION SYSTEM FOR NETWORK TRAFFIC

TECHNICAL FIELD

The present disclosure relates generally to wireless communication systems, and more particularly, to methods and apparatus for providing a delayed attack protection system for network traffic.

BACKGROUND

As wireless communication becomes more and more popular at offices, homes, schools, etc., protection of network traffic via wireless links are critical to ensure the security of wireless environments. Without such protection, wireless communication networks may be susceptible to security threats such as delayed attacks on network traffic to delay communication of time-sensitive information. For example, time-sensitive information may include emergency, health, and/or financial transaction information. Wired communication networks may also be susceptible to such delayed attacks on network traffic.

DETAILED DESCRIPTION

In general, methods and apparatus for providing delayed attack protection for network traffic of communication networks are described herein. The methods and apparatus described herein are not limited in this regard.

Figure 1:
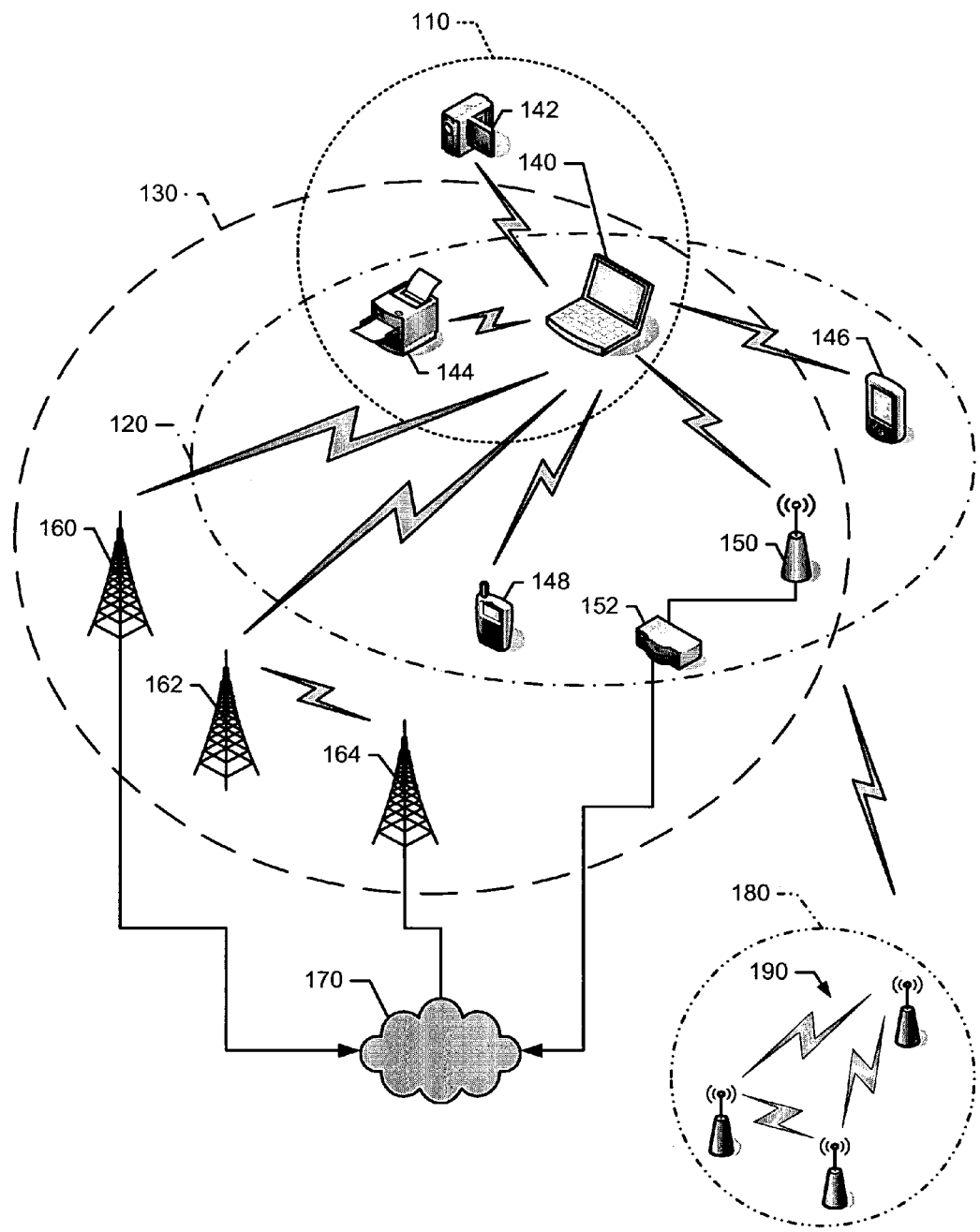
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., a basic service set (BSS) network in accordance with the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16, published 2004) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164. The common public or private network 170 may include one or more network servers (not shown).

The wireless communication system 100 may include other suitable wireless communication networks such as wireless mesh networks, generally shown as 180. The AP 150 and/or the base stations 160, 162, and 164 may be associated with one or more wireless mesh networks. In one example, the AP 150 may communicate with and/or operate as one of a plurality of mesh points (MPs) 190 of the wireless mesh network 180. In particular, the AP 150 may receive and/or transmit data in connection with one or more of the plurality of MPs 190. The plurality of MPs 190 may include access points, redistribution points, end points, and/or other suitable connection points for traffic flows via mesh paths. The MPs 160 may use any modulation techniques, wireless communication protocols, and/or wired interfaces described above to communicate.

In another example, the wireless communication system 100 may include a wireless wide area network (WWAN) such as a cellular radio network (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. In addition or alternatively, the subscriber stations 140, 142, 144, 146, and 148, the AP 150, and/or the base stations 160, 162, and 164 may include a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate via wired links. Although certain examples have been described above, the scope of coverage of this disclosure is not limited thereto.

Figure 2:
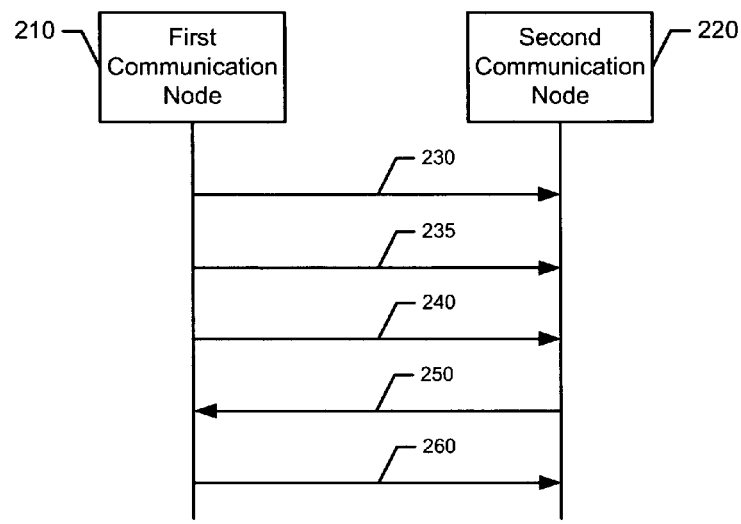
FIG. 2 depicts one example of a delayed attack protection system.

In the example of FIG. 2, a delayed attack protection system 200 may include two or more communication nodes, generally shown as a first communication node 210 and a second communication node 220. Each of the first communication node 210 and the second communication node 220 may be an AP, an MP, a subscriber station, a base station, or a network server as described above. In general, the first and second communication nodes 210 and 220 may communicate with each other to protect network traffic between the first and second communication nodes 210 and 220 from delayed attacks.

Figure 3:
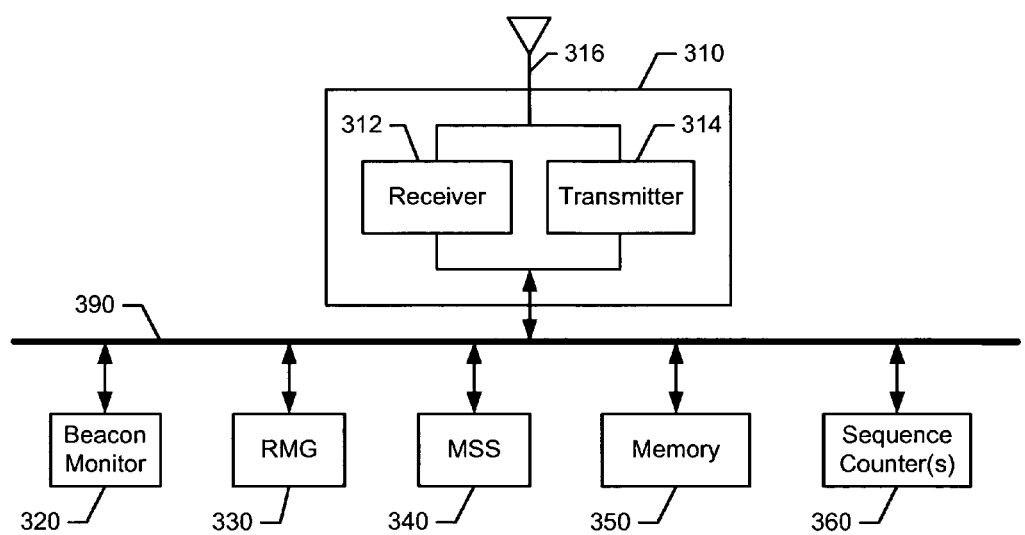
FIG. 3 is a block diagram representation of an example communication node of the example delayed attack protection system of FIG. 2.

Turning to FIG. 3, for example, a communication node 300 (e.g., the first communication 210 or the second communication node 220 of FIG. 2) may include a communication interface 310, a beacon monitor 320, a resynchronization message generator (RMG) 330, a message sequence synchronizer (MSS) 340, and a memory 350. The communication node 300 may also include one or more sequence counters, generally shown as 360. The communication interface 310, the beacon monitor 320, the RMG 330, the MSS 340, the memory 350, and/or the sequence counter(s) 360 may be operatively coupled to each other via a bus 390. Although FIG. 3 depicts components of the communication node 300 coupling to each other via the bus 390, these components may be operatively coupled to each other via other suitable direct or indirect connections (e.g., a point-to-point connection or a point-to-multiple point connection).

The communication interface 310 may include a receiver 312, a transmitter 314, and an antenna 316. The communication 300 may receive and/or transmit data via the receiver 312 and the transmitter 314, respectively. The antenna 316 may include one or more directional or omni-directional antennas such as dipole antennas, monopole antennas, patch antennas, loop antennas, microstrip antennas, and/or other types of antennas suitable for transmission of radio frequency (RF) signals. Although FIG. 3 depicts a single antenna, the communication node 300 may include additional antennas. For example, the communication node 300 may include a plurality of antennas to implement a multiple-input-multiple-output (MIMO) system.

As described in detail below, the beacon monitor 320 may monitor for one or more beacons indicative of one or more messages buffered for the communication node 300. The RMG 330 may generate resynchronization messages such as a resynchronization request (e.g., the resynchronization request 400 of FIG. 4), a resynchronization response (e.g., the resynchronization response 500 of FIG. 5), and/or a resynchronization confirmation (e.g., the resynchronization confirmation 600 of FIG. 6). The MSS 340 may update message sequencing information stored in the memory 350. In addition or alternatively, the MSS 340 may also update the message sequencing information of the sequence counter(s) 360. In one example, the sequence counter(s) 360 may include a counter for each frame type, frame sub-type, traffic class, and/or traffic type associated with the communication node 300.

While the components shown in FIG. 3 are depicted as separate blocks within the communication node 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). In another example, although the RMG 330 and the MSS 340 are depicted as separate blocks, the RMG 330 and the MSS 340 may be integrated into a single component. In yet another example, the sequence counter(s) 360 may be stored in the memory 350. The methods and apparatus described herein are not limited in this regard.

Referring back to FIG. 2, for example, the first communication node 210 may be a subscriber station (e.g., the laptop computer 140 of FIG. 1), and the second communication node 220 may be an AP (e.g., the AP 150 of FIG. 1). In one example, the subscriber station 210 may operate in a power-save mode, an idle mode, a sleep mode, and/or other suitable mode that the AP 220 may queue or buffer one or more messages for the subscriber station 210 (e.g., a hold-message mode), and the subscriber station 210 may inform the AP 220 accordingly (230). In particular, the AP 220 may queue or buffer one or more frames of a message associated with the subscriber station 210 while the subscriber station 210 operates in a hold-message mode. For example, the AP 220 may include a memory to store one or more frames of one or more messages associated with the subscriber station 210. While operating in the hold-message mode, the subscriber station 210 may periodically monitor beacons from the AP 220, which may indicate to the subscriber station 210 that the AP 220 has one or more buffered messages for the subscriber station 210.

When the subscriber station 210 exits from the hold-message mode or switches to another operating mode, the subscriber station 210 may transmit a poll message to the AP 220 to retrieve the buffered message(s) (235). In particular, the poll message may indicate to the AP 220 that the subscriber station 210 is no longer operating in the hold-message mode and is ready to receive the buffered message(s). However, the subscriber station 210 and/or the AP 220 may be susceptible or subject to delayed attacks when the subscriber station 210 exits from the hold-message mode. In one example, an attacker may selectively block the poll message from the subscriber station 210 to the AP 220. The AP 220 may not receive the poll message from the subscriber station 210. As a result, the AP 220 may continue to buffer frames associated with messages for the subscriber station 210 but the AP 220 may drop one or more frames because of memory constraints (e.g., lost information). In another example, an attacker may allow the AP 220 to receive the poll message from the subscriber station 210 but capture the buffered message(s) that are sent from the AP 220 to the subscriber station 210. Thus, the subscriber station 210 may receive the buffered message(s) at a later time or not at all.

Figure 4:
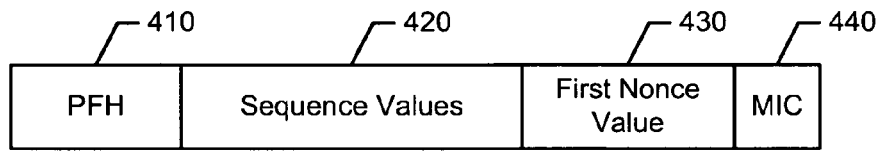
FIG. 4 is a block diagram representation of an example resynchronization request of the example delayed attack protection system of FIG. 2.

To protect against such delayed attacks, the methods and apparatus described herein may provide a delayed attack protection system in which the subscriber station 210 and the AP 220 may partake in a resynchronization session to exchange resynchronization messages. In particular, the subscriber station 210 may generate and transmit a resynchronization request (e.g., the resynchronization request 400 of FIG. 4) to the AP 220 (240). In general, the resynchronization request 400 may include message sequencing information associated with the subscriber station 210 to receive message sequencing information associated with the AP 220 for retrieving buffered message(s) from the AP 220. In the example of FIG. 4, a resynchronization request 400 may include a protocol frame header (PFH) field 410, a sequence value field 420, a nonce value field 430, and a message integrity code (MIC) field 440. While FIG. 4 depicts four fields, the resynchronization request 400 may include additional or fewer fields. Further, although a particular order of fields is illustrated in FIG. 4, these fields may be arranged in other sequences.

The PFH field 410 may include addressing and protocol control information (e.g., information to identify the subscriber station 210 as the source node of the resynchronization request 400). The sequence value field 420 may include sequence values associated with the subscriber station 210 (e.g., latest sequence values of the sequence counters 360 of FIG. 3). In particular, the sequence value field 420 may include sequence values indicative of the latest values associated with a frame type and/or a frame sub-type of the resynchronization request 400. For example, the sequence values may be the latest sequence numbers of the frame type and/or the frame sub-type of the resynchronization request 400.

The nonce value field 430 may include a first nonce value, which may be a unique value associated with the current resynchronization session. For example, the nonce value field 430 may include a random, relatively large number generated by a hardware and/or software pseudo-random number generator (e.g., 48-octets or larger) at the subscriber station 210. The MIC field 440 (or a message authentication code (MAC) field) may include an MIC to protect against forgery of the sequence values in the sequence value field 420. That is, the MIC may indicate that the content of the resynchronization request 400 is integrity protected by an integrity protection key known only to the subscriber station 210 and the AP 220. The methods and apparatus described herein are not limited in this regard.

Figure 5:
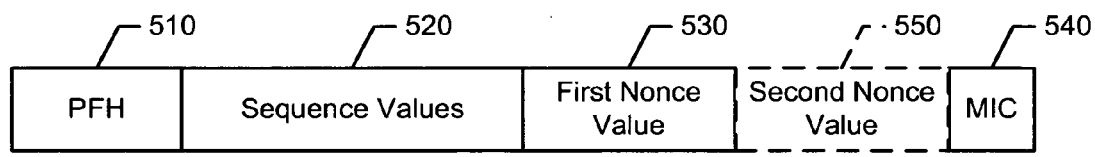
FIG. 5 is a block diagram representation of an example resynchronization response of the example delayed attack protection system of FIG. 2.

Turning back to FIG. 2 again, the AP 220 may receive the resynchronization request from the subscriber station 210. Based on the resynchronization request, the AP 220 may generate and transmit a resynchronization response (e.g., the resynchronization response 500 of FIG. 5) to the subscriber station 210 (250). In general, the resynchronization response 500 may include message sequencing information to synchronize the subscriber station 210 with the AP 220. In the example of FIG. 5, a resynchronization response 500 may include a PFH field 510, one or more sequence value fields, generally shown as 520, a first nonce value field 530, and a MAC field 540.

The PFH field 510 may include addressing and protocol control information (e.g., information to identify the AP 220 as the source node of the resynchronization response 500). The sequence value field 520 may include one or more sequence values of frame type and/or frame sub-type associated with the resynchronization response 500. In particular, if the sequence values of the sequence value field 520 are subsequent to the sequence values of the sequence value field 420, the resynchronization response 500 has not been delayed. In one example, the sequence number of the resynchronization request 400 may be five (5) and the sequence number of the resynchronization response 500 may be six (6). Accordingly, the resynchronization request 400 and the resynchronization response 500 are in order because the sequence number of the resynchronization response 500 is subsequent to the sequence number of the resynchronization request 400. In another example, the sequence number of the resynchronization request 400 may be five (5) but the sequence number of the resynchronization response 500 is less than 5 (e.g., four (4), three (3), two (2), or one (1)). In this particular example, a message delay may have occurred because the sequence number of the resynchronization response 500 is prior to the sequence number of the resynchronization request 400.

Further, a message delay may also occur if the sequence numbers between the resynchronization request 400 and the resynchronization response 500 are communicated outside of a communication window (e.g., a threshold for separation between the sequence numbers). If the sequence numbers are within the communication window, then the variation in the sequence numbers may be tolerated. For example, the sequence number of the resynchronization request 400 may be five (5) and the sequence number of the resynchronization response 500 may be eight (8). In one example, if the communication window is four (4), the variation in the sequence numbers of the resynchronization request 400 and the resynchronization response 500 may be tolerated because the variation is within the communication window (e.g., the sequence numbers are separated by 3, which is less than the communication window of 4). In another example, if the communication window is two (2), the variation in the sequence numbers may not be tolerated because the variation exceeds the communication window (e.g., the sequence numbers are separated by 3, which is greater than the communication window of 2).

The sequence value field 520 may also include one or more sequence values associated with frame type, frame sub-type, traffic class, and traffic type of the AP 220. In one example, the types of frame of the IEEE std. 802.11 may include management frame, control frame, and data frame. For example, the sub-types of management frames may include authentication frame, deauthentication frame, association response frame, reassociation request frame, reassociation response frame, disassociation frame, beacon frame, probe request frame, and probe response frame. The sub-types of control frames may include request-to-send (RTS) frame, clear-to-send (CTS) frame, and acknowledgement (ACK) frame. The classes of traffic may include values corresponding to incoming user priority (e.g., 0, 1, 2, 3, 4, 5, 6, and 7). The types of traffic may include network control, voice, video, controlled load, excellent effort, best effort, and background. As described in detail below, the sequence values of the sequence value field 520 may allow the subscriber station 210 to detect delayed attacks and/or to synchronize with the AP 220.

The first nonce value field 530 may include the nonce value of the nonce value field 430 associated with the resynchronization request 400 (e.g., copy the nonce value of the nonce value field 430). The nonce value of the first nonce value field 530 may indicate to the subscriber station 210 that the AP 220 did not generate the resynchronization response 500 prior to the subscriber station 210 generating the resynchronization request 400. In a similar manner to the MIC field 440 of the resynchronization request 400, the MIC field 540 may include an MIC to protect against forgery of the sequence values in the sequence value field 520.

The resynchronization response 500 may also include a second nonce value field 550 (e.g., an optional field as indicated by dash lines). The second nonce value field 550 may include a unique value associated with the resynchronization response 500. For example, the nonce value of the second nonce value field 550 may be different from the nonce value of the first nonce value field 530. The second nonce value field 550 may indicate to and/or instruct the subscriber station 210 to generate a resynchronization confirmation (e.g., the resynchronization confirmation 600 of FIG. 6) as described in detail below. While FIG. 5 depicts five fields, the resynchronization response 500 may include additional or fewer fields. In one example, the resynchronization response 500 may not include the second nonce field 550. Further, although a particular order of fields is illustrated in FIG. 5, these fields may be arranged in other sequences. The methods and apparatus described herein are not limited in this regard.

Referring back to FIG. 2 again, the subscriber station 210 may receive the resynchronization response from the AP 220. To protect against delayed attacks, the subscriber station 210 may process incoming messages based on the resynchronization response 500. In one example, the subscriber station 210 may detect a delayed attack if the sequence values of an incoming message are less than the sequence values of the resynchronization response 500. Accordingly, the subscriber station 210 may disregard the incoming message (e.g., discard one or more frames with sequence values less than the sequence values of the resynchronization response 500). Further, the subscriber station 210 may update the sequence values stored in local sequence counter(s) (e.g., the sequence counter(s) 360 of FIG. 3) and/or a local memory (e.g., the memory 340 of FIG. 3) based on the sequence values of the sequence value field 520.

Figure 6:
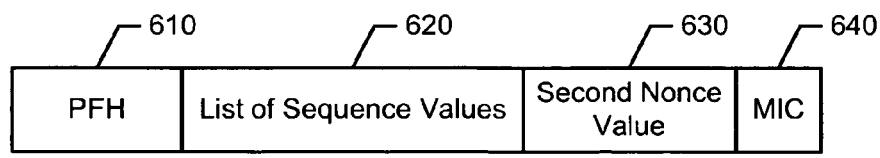
FIG. 6 is a block diagram representation of an example resynchronization confirmation of the example delayed attack protection system of FIG. 2.

As noted above, the second nonce field 550 may be optional in the resynchronization response 500. If the resynchronization response 500 does not include a nonce value in the second nonce value field 550, the subscriber station 210 does not generate a resynchronization confirmation for the AP 220 to synchronize with the sequence values of the subscriber station 210. Otherwise if the resynchronization response 500 includes a nonce value in the second nonce value field 550, the subscriber station 210 may generate and transmit a resynchronization confirmation (e.g., the resynchronization confirmation 600 of FIG. 6) to the AP 220 (260). As mentioned above, the subscriber station 210 may generate the resynchronization confirmation 600 in response to detecting a second nonce value. In general, the resynchronization confirmation 600 may include message sequencing information to synchronize the AP 220 with the subscriber station 210. In the example of FIG. 6, a resynchronization confirmation 600 may include a PFH field 610, one or more sequence value field 620, a nonce field 630, and a MAC field 640. While FIG. 6 depicts four fields, the resynchronization confirmation 600 may include additional or fewer fields. Further, although a particular order of fields is illustrated in FIG. 6, these fields may be arranged in other sequences.

In a similar manner to the sequence value field 520 of FIG. 5, the sequence value field 620 may include one or more sequence values associated with each frame type, frame sub-type, traffic class, and traffic type of the subscriber station 210. As described in detail below, the sequence values of the sequence value field 620 may allow the AP 220 to synchronize with the subscriber station 210 and/or to determine whether to disregard incoming messages (e.g., discard one or more frames with sequence values less than the sequence values of the resynchronization response 500).

If the second nonce value field 550 of the resynchronization response 500 includes a second nonce value, the subscriber station 210 may include the second nonce value from the second nonce value field 550 in the nonce value field 630 of the resynchronization confirmation 600 (e.g., copy the nonce value of the second nonce value field 550). The MIC field 640 may include an MIC to protect against forgery of the sequence values in the sequence value field 620. The methods and apparatus described herein are not limited in this regard.

The AP 220 may receive the resynchronization confirmation 600 from the subscriber station 210. To protect against delayed attacks, the AP 220 may verify the MIC of the MIC field 640. The AP 220 may also compare the nonce value of the nonce value field 630 to the nonce value of the second nonce value field 530 of the resynchronization response 500 to determine whether the resynchronization confirmation 600 was prematurely generated before the subscriber station 210 received the resynchronization response 500. If the nonce values of the nonce value field 630 and the second nonce value field 530 are the same, the AP 220 may update the sequence values stored in a local memory based on the sequence values of the sequence value field 620. As a result, the AP 220 may be synchronized with the subscriber station 210.

Although the above examples are described with respect to the subscriber station 210 initiate the resynchronization session, the methods and apparatus described herein may be implemented so that the AP 220 may initiate the resynchronization session. Further, while the above examples are described with respect to a subscriber station and an AP of a BSS network, the methods and apparatus described herein may be implemented to other suitable communication nodes. In one example, a mesh node may initiate the resynchronization session as described herein between two mesh nodes of a wired and/or wireless mesh network (e.g., between two or more of the MPs 190 of the wireless mesh network 180 of FIG. 1). In another example, a subscriber station may initiate the resynchronization session as described herein with a base station (e.g., between the laptop computer 140 and the base station 160 of FIG. 1).

In addition, while the above examples are described with respect to network traffic via wireless links, the methods and apparatus described herein may be implemented to network traffic via wired links (e.g., between the AP 150 and the router 152 of FIG. 1). Further, although the above examples are described with respect to a data frame, the methods and apparatus described herein may be implemented to packets and/or other suitable protocol data units (PDUs).

Figure 7:
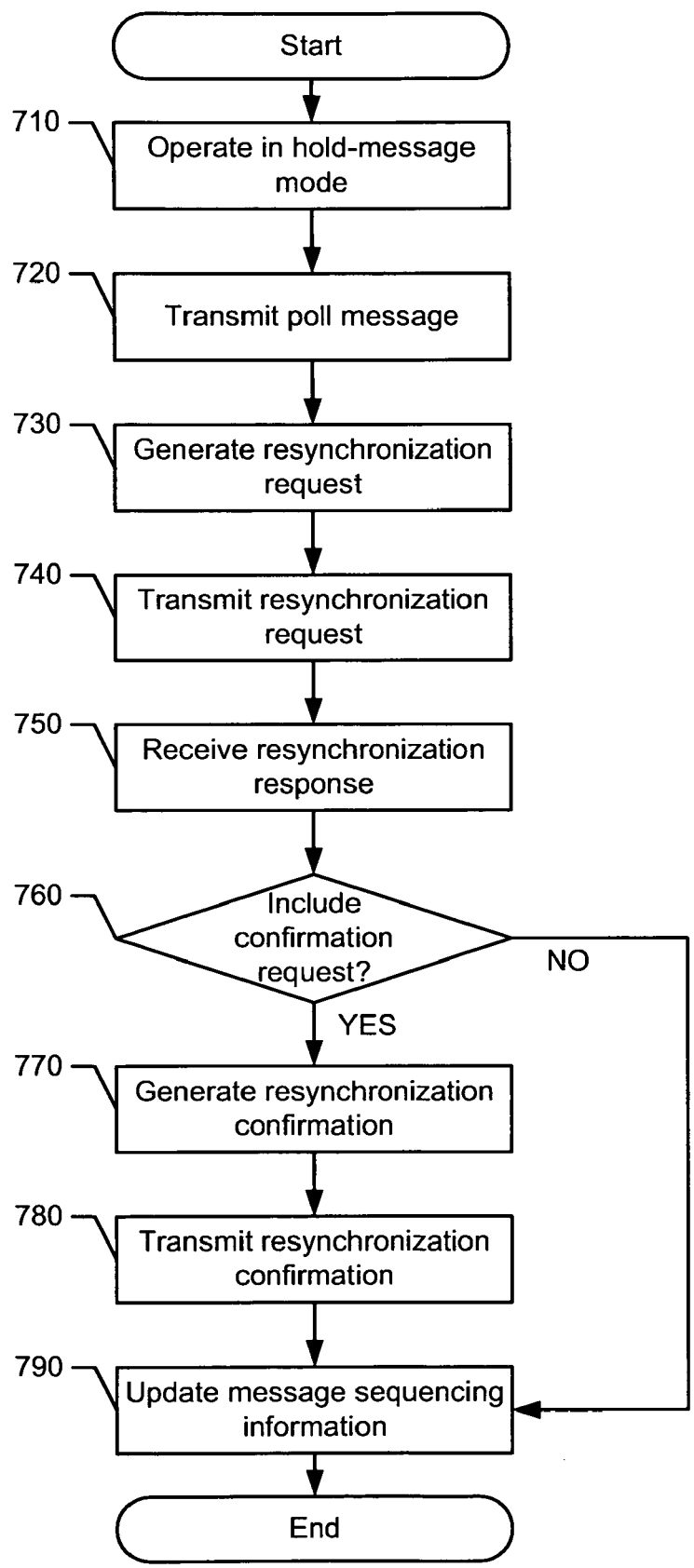
FIG. 7 is a flow diagram representation of one manner in which the example delayed attack protection system of FIG. 2 may be configured to provide delayed attack protection for network traffic.

FIG. 7 depicts one manner in which the example communication node of FIG. 3 may be configured to provide a delayed attack protection system for network traffic. The example process 700 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 7, these actions can be performed in other temporal sequences. Again, the example process 700 is merely provided and described in conjunction with the apparatus of FIGS. 2 and 3 as an example of one way to configure a communication node to provide a delayed attack protection system for network traffic of wired and/or wireless communication networks.

In the example of FIG. 7, the process 700 may begin with the first communication node 210 operating in a hold-message mode (e.g., a power-save mode) or other suitable mode in which the second communication node 220 may buffer or queue messages for the first communication node 210 (block 710). In the hold-message mode, the first communication node 210 (e.g., via the beacon monitor 320 of FIG. 3) may periodically monitor for beacons indicative of one or more messages being buffered by the second communication node 220 for the first communication node 210.

To retrieve the buffered message(s), the first communication node 210 may exit the hold-message mode and transmit a poll message to the second communication node 220 (block 720). The poll message may indicate to the AP 220 that the first communication node 210 has switched from the hold-message mode to a mode to receive buffered message(s) from the second communication node 220. To initiate a resynchronization session for retrieving buffered message(s) from the second communication node 220, the first communication node 210 (e.g., via the RMG 330 of FIG. 3) may generate a resynchronization request (e.g., the resynchronization request 400 of FIG. 4) (block 730). As noted above, the resynchronization request may include message sequencing information and message integrity information associated with the first communication node 210. The first communication node 210 may transmit the resynchronization request to the second communication node 220 (block 740).

In response to the resynchronization request from the first communication node 210, the second communication node 220 may generate and transmit a resynchronization response (e.g., the resynchronization response 500 of FIG. 5) to the first communication node 210. The first communication node 210 may receive the resynchronization response (block 750). In one example, the resynchronization response may include one or more sequence values associated with frame type, frame sub-type, traffic class, and traffic type of the second communication node 220 so that the first communication node 220 may be synchronized with the second communication node 220. Further, the first communication node 210 may determine whether the resynchronization response includes a confirmation request to generate a resynchronization confirmation (e.g., the resynchronization confirmation 600 of FIG. 6) (block 760). In one example, the first communication node 210 may determine whether the resynchronization response includes a nonce value to indicate that the second communication node 220 is requesting for a resynchronization confirmation.

If the resynchronization response includes a confirmation request, the first communication node 210 (e.g., via the RMG 330 of FIG. 3) may generate a resynchronization confirmation (block 770). In one example, the resynchronization confirmation may include one or more sequence values associated with frame type, frame sub-type, traffic class, and traffic type of the first communication node 210 so that the second communication node 220 may be synchronized with the first communication node 210. The first communication node 210 may transmit the resynchronization confirmation to the second communication node 220 (block 780). Based on the resynchronization response from the second communication node 220, the first communication node 210 (e.g., via the MSS 340 of FIG. 3) may update and synchronize message sequencing information stored at the first communication node 210 (block 790). For example, the MSS 340 may update the message sequencing information stored in the memory 350 and/or the sequence values of the sequence counter(s) 360.

Otherwise if the resynchronization response fails to include a confirmation request at block 760, control may proceed directly to block 790. In one example, if the resynchronization response 500 does not include the second nonce value 550, the first communication node 210 may not generate a resynchronization confirmation. The methods and apparatus described herein are not limited in this regard.

Although the above examples are described with respect to a subscriber station and an AP, the methods and apparatus described herein may be implemented to provide a delayed attack integrity protection for network traffic between other communication nodes. In one example, the methods and apparatus described herein may be implemented to provide delayed attack protection for network traffic via a wired or wireless link between two or more MPs of a mesh network. In another example, the methods and apparatus described herein may be implemented to provide delayed attack protection for network traffic via a wireless link between a subscriber station and a base station. In yet another example, the methods and apparatus described herein may be implemented to provide delayed attack protection for network traffic via a wired link between a base station and a network server.

Figure 8:
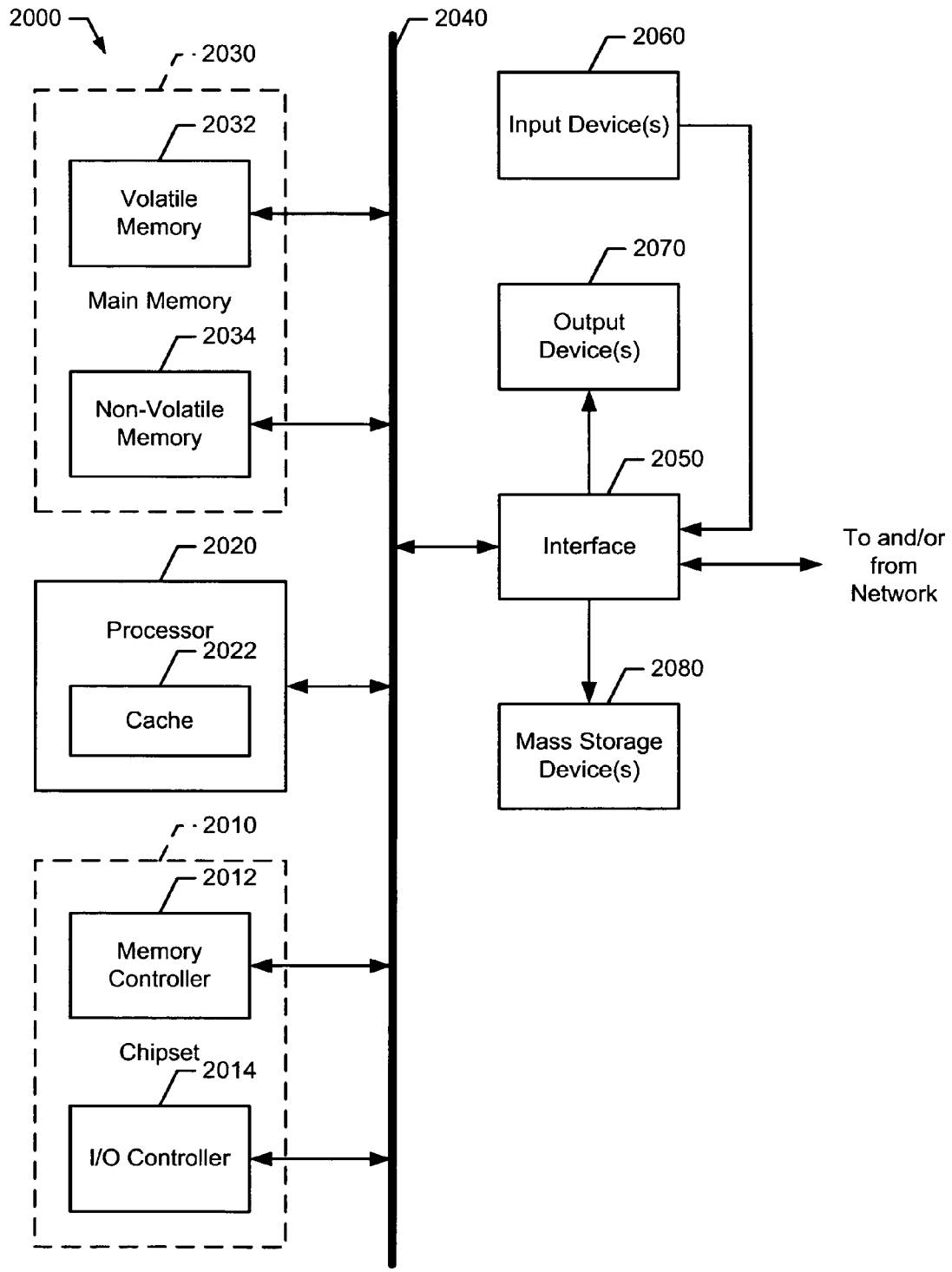
FIG. 8 is a block diagram representation of an example processor system that may be used to implement the example communication node of FIG. 3.

FIG. 8 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 8 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 8 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   operating a first communication node in a hold-message mode;
   receiving a beacon at the first communication node from a second communication node, the beacon indicative of the second communication node buffering one or more messages for the first communication node;
   exiting the hold-message mode;
   retrieving buffered messages from the second communication node after said exiting, said retrieving including transmitting a poll request from the first communication node to the second communication node to indicate said exiting of the hold-message mode, and
receiving the one or more messages from the second communication node;
transmitting a resynchronization request from the first communication node to the second communication node, the resynchronization request having a first sequence value of a frame type or a subframe type associated with the resynchronization request;
receiving a resynchronization response at the first communication node from the second communication node, the resynchronization response having a second sequence value of a frame type or a subframe type associated with the resynchronization response;
comparing the first sequence value to the second sequence value; and
identifying a delay attack associated with said retrieving of the buffered messages based at least in part on said comparing.

2. The method as defined in claim 1 further comprising generating the resynchronization request at the first communication node, and wherein the resynchronization request comprises a protocol header frame field, a sequence value field, a nonce field, and a message integrity code field.

3. The method as defined in claim 1 further comprising generating a resynchronization confirmation at the first communication node in response to detecting a nonce value generated by the second communication node in the resynchronization response, and wherein the resynchronization confirmation comprises at least one of a protocol header frame field, a sequence value field, a nonce value field, or a message integrity code field.

4. The method as defined in claim 1 further comprising transmitting a resynchronization confirmation from the first communication node to the second communication node to synchronize the second communication node with the first communication node.

5. The method as defined in claim 1 further comprising synchronizing one or more sequence values at the first communication node based on the resynchronization response.

6. The method as defined in claim 1, wherein at least one of the first and second communication nodes comprises at least one of an access point, a mesh point, a subscriber station, a base station, or a network server.

7. The method as defined in claim 1, wherein said comparing includes determining that the first sequence value is greater than the second sequence value and said identifying is based at least in part on said determining.

8. The method as defined in claim 1, wherein said comparing includes determining that the second sequence value is within a predetermined number of sequence values from the first sequence value and said identifying is based at least in part on said determining.

9. An article of manufacture including content, which when executed, causes a machine to:
operate in a hold-message mode;
receiving a beacon from a communication node, the beacon indicative of the communication node buffering one or more messages for the machine;
exit the hold-message mode;
retrieve buffered messages from the communication node after exiting the hold-message mode by
transmitting a poll request from the first communication node to the second communication node to indicate said exiting of the hold-message mode, and
receiving the one or more messages from the second communication node;
generate a resynchronization request having a first sequence value of a frame type or a subframe type associated with the resynchronization request;
transmit the resynchronization request to the communication node;
receive a resynchronization response from the communication node, the resynchronization response having a second sequence value of a frame type or a subframe type associated with the resynchronization response;
compare the first sequence value to the second sequence value; and
identify a delay attack associated with said retrieval of the buffered messages based at least in part on said comparison.

10. The article of manufacture as defined in claim 9, wherein the content, when executed, causes the machine to generate the resynchronization request by generating a request comprising a protocol header frame field, a sequence value field, a nonce value field, and a message integrity code field.

11. The article of manufacture as defined in claim 9, wherein the content, when executed, causes the machine to generate a resynchronization confirmation in response to detecting a nonce value generated by the communication node in the resynchronization response, and wherein the resynchronization confirmation comprises a protocol header frame field, a sequence value field, a nonce value field, and a message integrity code field.

12. The article of manufacture as defined in claim 9, wherein the content, when executed, causes the machine to transmit a resynchronization confirmation to the communication node to synchronize the communication node with the machine.

13. The article of manufacture as defined in claim 9, wherein the content, when executed, causes the machine to synchronize one or more sequence values at the machine based on the resynchronization response.

14. An apparatus comprising:
a beacon monitor to receive a beacon from a communication node
a communication interface to transmit and receive network communications;
a delayed attack protection system coupled to the communication interface and configured to
operate the apparatus in a hold-message mode;
receive, via the communication interface, a beacon from a communication node, the beacon indicative of the communication node buffering one or more messages for the apparatus while the apparatus is operating in the hold-message mode;
exit the hold-message mode;
retrieve buffered messages from the communication node after the hold-message mode is exited by transmitting a poll request to the second communication node to indicate said exiting of the hold-message mode, and receiving the one or more messages from the communication node;
transmit a resynchronization request having a first sequence value of a frame type or subframe type associated with the resynchronization request to the communication node via the communication interface;
receive, via the communication interface, a resynchronization response including a second sequence value of a frame type or a subframe type associated with the resynchronization response from the second communication node, compare the first sequence value to the second sequence value; and identify a delay attack associated with said retrieval of the buffered messages based at least in part on said comparison.

15. The apparatus as defined in claim 14, wherein the resynchronization request comprises at least one of a protocol header frame field, a sequence value field, a nonce value field, and a message integrity code field.

16. The apparatus as defined in claim 14, wherein the resynchronization request comprises message sequence information and message integrity information associated with at least one of an access point, a mesh point, a subscriber station, a base station, or a network server.

17. The apparatus as defined in claim 14, wherein the delayed attack protection system is further configured to transmit a resynchronization confirmation in response to detecting a nonce value generated by the communication node in the resynchronization response, and wherein the resynchronization response comprises at least one of a protocol header frame field, a sequence value field, a nonce value field, and a message integrity code field.

18. The apparatus as defined in claim 14, wherein the apparatus comprises at least one of an access point, a mesh point, a subscriber station, a base station, or a network server.

* * * * *

UNITED STATES PATENT AND TRADEMARK OFFICE
CERTIFICATE OF CORRECTION

PATENT NO. : 7,630,406 B2 Page 1 of 1
APPLICATION NO. : 11/267697
DATED : December 8, 2009
INVENTOR(S) : Sood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1022 days.

Signed and Sealed this

Second Day of November, 2010

David J. Kappos
*Director of the United States Patent and Trademark Office*